US008451623B2

(12) United States Patent
Chiu et al.

(10) Patent No.: US 8,451,623 B2
(45) Date of Patent: May 28, 2013

(54) MOUNTING APPARATUS FOR EXPANSION CARD

(75) Inventors: Po-Wen Chiu, Taipei Hsien (TW); Zhan-Yang Li, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 276 days.

(21) Appl. No.: 12/938,594

(22) Filed: Nov. 3, 2010

(65) Prior Publication Data
US 2011/0310584 A1 Dec. 22, 2011

(30) Foreign Application Priority Data
Jun. 17, 2010 (CN) .......................... 2010 1 0201923

(51) Int. Cl.
*H05K 7/12* (2006.01)

(52) U.S. Cl.
USPC . 361/801; 361/809; 361/679.02; 361/679.41; 361/796

(58) Field of Classification Search
USPC ............... 361/809, 679.01, 679.02, 730, 759, 361/796, 798, 752
See application file for complete search history.

(56) References Cited

U.S. PATENT DOCUMENTS

| | | | | |
|---|---|---|---|---|
| 5,831,821 A | * | 11/1998 | Scholder et al. | 361/679.32 |
| 5,928,024 A | * | 7/1999 | Ming-Huang | 439/377 |
| 7,595,994 B1 | * | 9/2009 | Sun | 361/721 |
| 7,852,623 B2 | * | 12/2010 | Lu | 361/679.48 |
| 8,264,831 B2 | * | 9/2012 | Hsieh et al. | 361/679.32 |

* cited by examiner

*Primary Examiner* — Ishwarbhai Patel
*Assistant Examiner* — Paresh Paghadal
(74) *Attorney, Agent, or Firm* — Altis Law Group, Inc.

(57) ABSTRACT

A mounting apparatus includes a chassis, an expansion piece secured to a first end of an expansion card, a carrier and a supporting device configured to support a second end of the expansion card. The chassis includes a bottom plate, and the carrier is mounted on the bottom plate. The supporting device includes a first supporting member secured to the carrier, and a second supporting member secured to the first supporting member. The first supporting member and the second supporting member sandwich the expansion card when the second supporting member is attached on the first supporting member.

18 Claims, 6 Drawing Sheets

MOUNTING APPARATUS FOR EXPANSION CARD

CROSS-REFERENCE TO RELATED APPLICATIONS

This application is related to co-pending application entitled, "MOUNTING APPARATUS FOR EXPANSION CARD", filed on Oct. 22, 2010, application Ser. No. 12/910,670.

BACKGROUND

1. Technical Field

The present disclosure relates to mounting apparatuses, and more particularly to a mounting apparatus for securing expansion cards in an electronic device.

2. Description of Related Art

A computer system usually includes expansion cards, such as sound cards, video cards, graphics cards and so on, for enhancing capabilities of the computer system. The expansion cards are often fixed in the computer system with screws. However, installing screws to fix the expansion cards is very laborious and time-consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
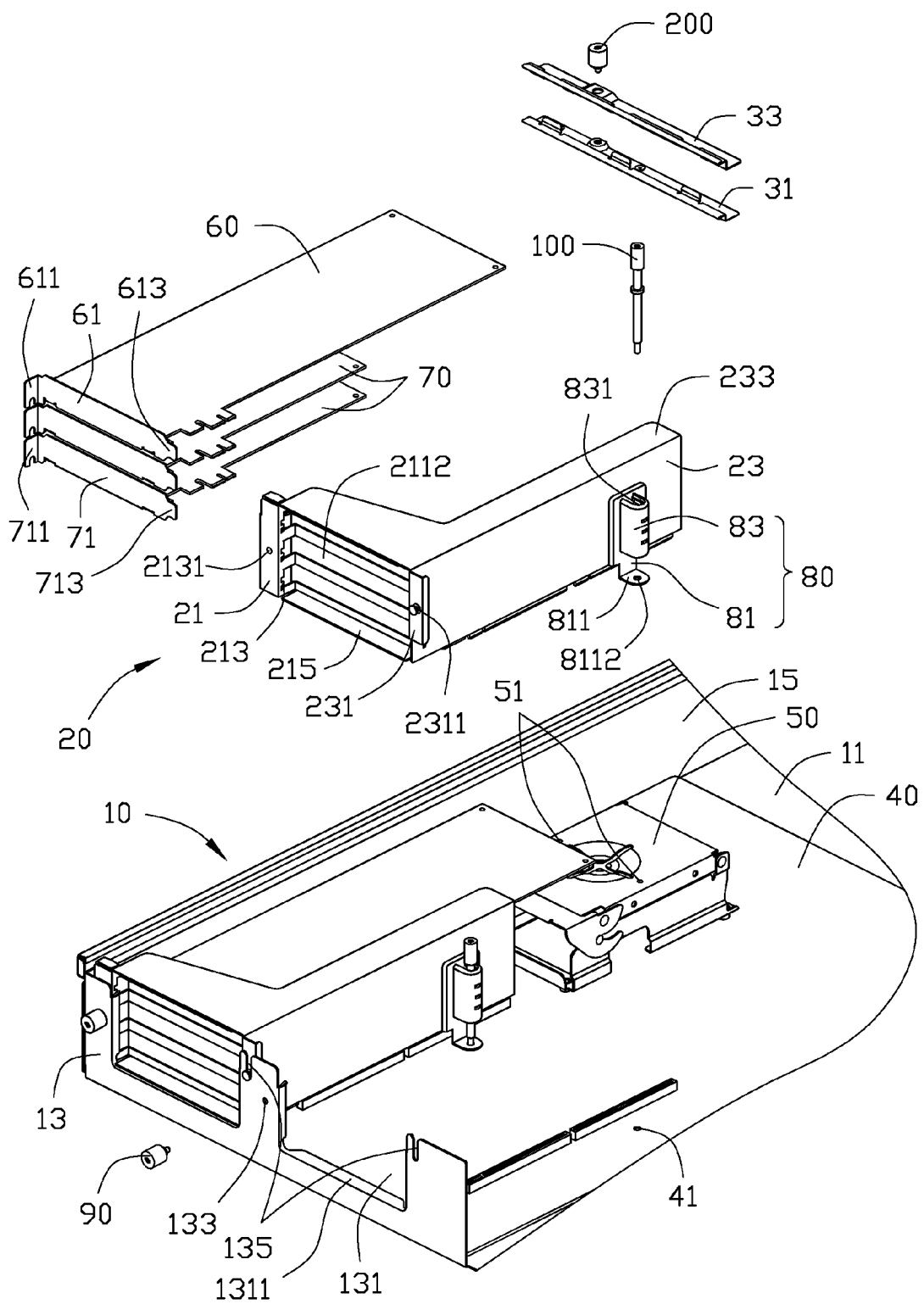
FIG. 1 is an exploded, cutaway, isometric view of a mounting apparatus for an expansion card in accordance with an embodiment.
Figure 2:
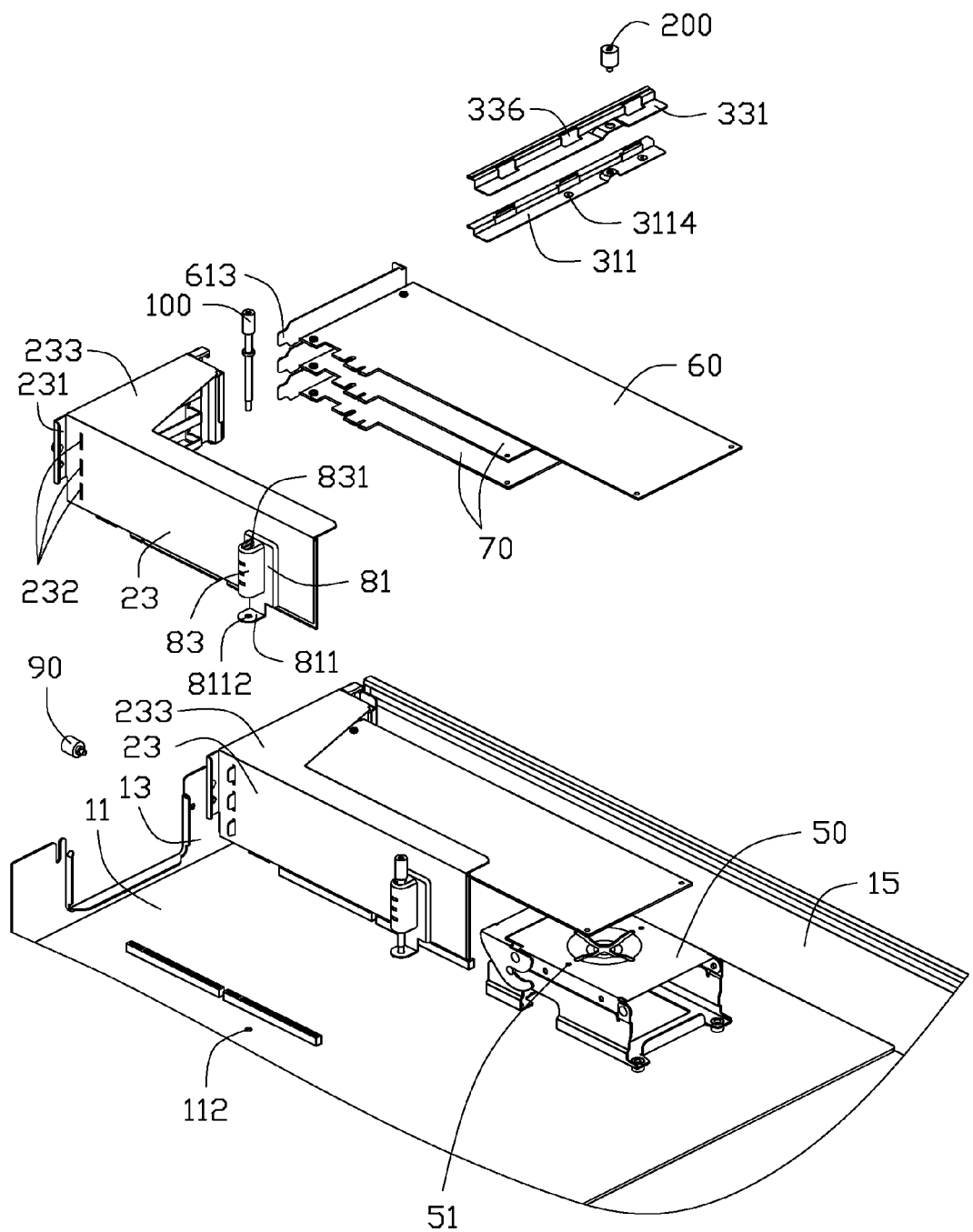
FIG. 2 is similar to FIG. 1, but viewed from a different aspect.
Figure 3:
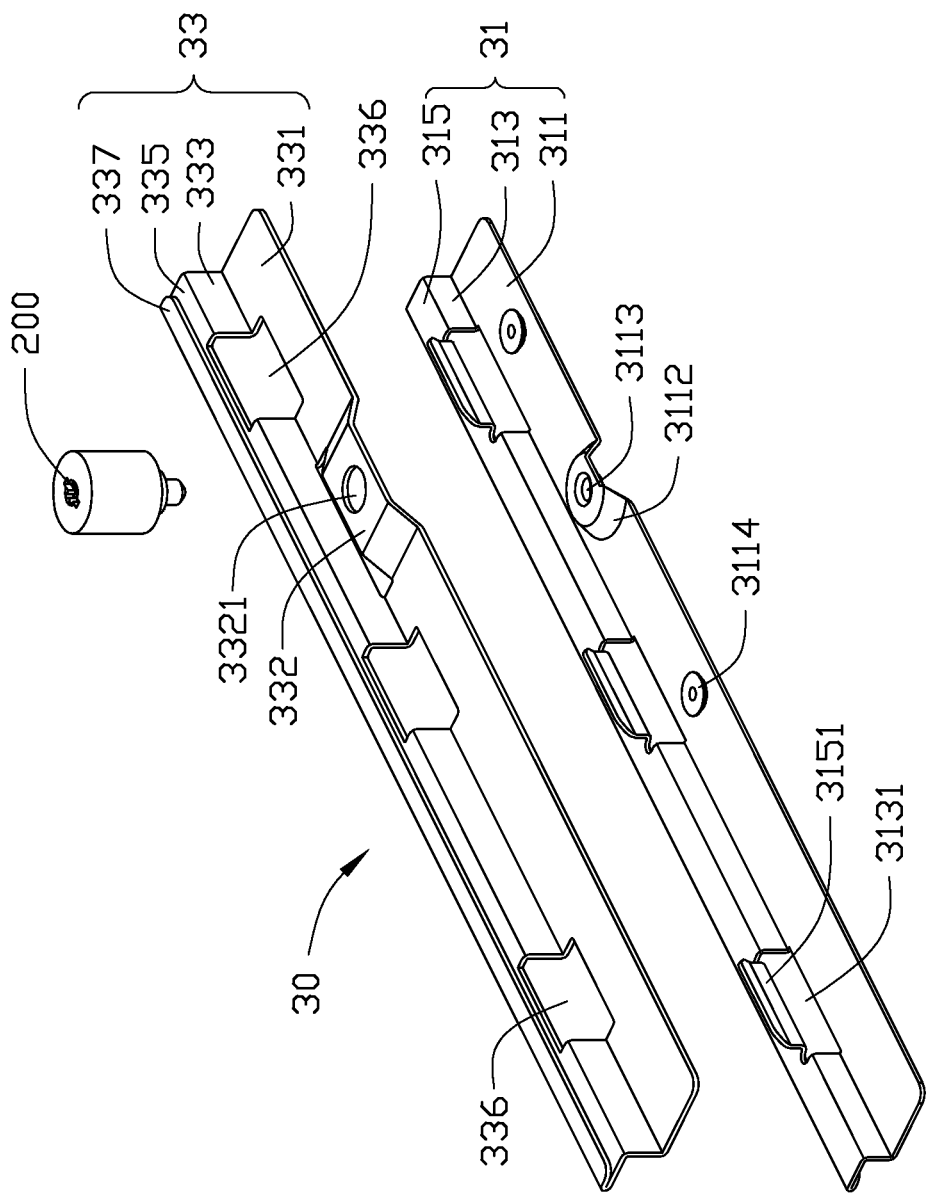
FIG. 3 is an exploded, isometric view of a supporting device of the mounting apparatus in accordance with an embodiment.

Referring to FIGS. 1 to 3, a mounting apparatus in accordance with an embodiment, includes a chassis 10, two mounting trays 20, and a supporting device 30. In one embodiment, the mounting apparatus is configured for securing a first expansion card 60 and two second expansion cards 70.

An expansion piece 61 is secured to the front of the first expansion card 60, and two expansion pieces 71 are respectively secured to the fronts of the two second expansion cards 70. A flange 611 is located on one end of the expansion piece 61, and a flange 711 is located on one end of each expansion piece 71. An inserting portion 613 is positioned on the other end of the expansion piece 61, and an inserting portion 713 is positioned on the other end of each expansion piece 71. In one embodiment, the first expansion card 60 is longer than the two second expansion cards 70. The first and second expansion cards 60, 70 may be, for example, sound cards, video cards, graphics cards, or other PCI (Peripheral Component Interconnection) cards.

The chassis 10 includes a bottom plate 11, a front plate 13 connected< to a shorter edge of the bottom plate 11, and a side plate 15 connected to a longer edge of the bottom plate 11. In one embodiment, the bottom plate 11 is substantially perpendicular to the front plate 13 and the side plate 15. A motherboard 40 is secured to the bottom plate 11, and a mounting hole 41 is defined in the motherboard 40, corresponding to a hole (not shown) in the bottom plate 11. A carrier 50 is secured on the bottom plate 11 and abuts the side plate 15. The carrier 50 is configured to receive a CPU (not shown). Two positioning holes 51 are defined in the top of the carrier 50. Two openings 131, two screw holes 133, and two notches 135 are defined in the front plate 13. A supporting piece 1311 is formed extending in from a bottom edge of each opening 131.

Each mounting tray 20 includes a front panel 21, a side panel 23, and a top panel 233. The top panel 233 is connected to the front panel 21 and the side panel 23. In one embodiment, the top panel 233 is substantially perpendicular to the front panel 21 and the side panel 23. Three expansion slots 2112 are defined in the front panel 21, a stopper piece 213 is formed adjacent to the three expansion slots 2112, and a securing hole 2131 is defined adjacent to the stopper piece 213, corresponding to the screw hole 133 of the front plate 13. An extend piece 215 is located on an edge of the front panel 21, for being placed on the supporting piece 1311 of the front plate 13.

A securing piece 231 is positioned on the front of the side panel 23, and three clipping holes 232 are defined in the side panel 23, to respectively receive the inserting portions 613, 713. In one embodiment, the securing piece 231 is substantially perpendicular to the side panel 23. A protruding post 2311 is located on the securing piece 231, to be inserted into the notch 135 of the front plate 13. A mounting member 80 is secured on the side panel 23. The mounting member 80 includes a mounting wall 81 fixed on the side panel 23, and an accommodating portion 83 connected to the mounting wall 81. A mounting piece 811 is located on a bottom end of the mounting wall 81, and a mounting hole 8112 is defined in the mounting piece 811, corresponding to the mounting hole 112 of the bottom plate 11 and the hole of the motherboard 40. A through hole 831 is defined in the accommodating portion 83.

Referring to FIG. 3, the supporting device 30 includes a first supporting member 31 secured to the carrier 50, and a second supporting member 33 configured for being engaged with the first supporting member 31.

The first supporting member 31 includes a fixing plate 311, a connecting plate 313 connected to the fixing plate 311, and a supporting plate 315 connected to the connecting plate 313. In one embodiment, the connecting plate 313 is substantially perpendicular to the fixing plate 311 and the supporting plate 315. A protrusion 3112 and two positioning portions 3114 are located on the fixing plate 311. The two positioning portions 3114 are capable of being inserted into the two positioning holes 51 of the carrier 50. In one embodiment, the protrusion 3112 is located between the two positioning portions 3114. A locking hole 3113 is defined in the protrusion 3112. Three slots 3131 are defined in the connecting plate 313 and extend to the supporting plate 315. A catch 3151 is positioned an edge on the supporting plate 315 of each of the three slots 3131.

The second supporting member 33 includes a fastening plate 331 secured to the fixing plate 311, a connecting plate 333 connected to the fastening plate 331, a retaining plate 335 connected to the connecting plate 333, and a supporting piece 337 disposed on the connecting plate 333. A bridge 332 is formed on the fastening plate 331, and a fastening hole 3321 is defined in the bridge 332, corresponding to the locking hole 3113 of the protrusion 3112. Three clasping holes 336 are defined in the fastening plate 331 and the retaining plate 335, for receiving the three catches 3151.

Figure 4:
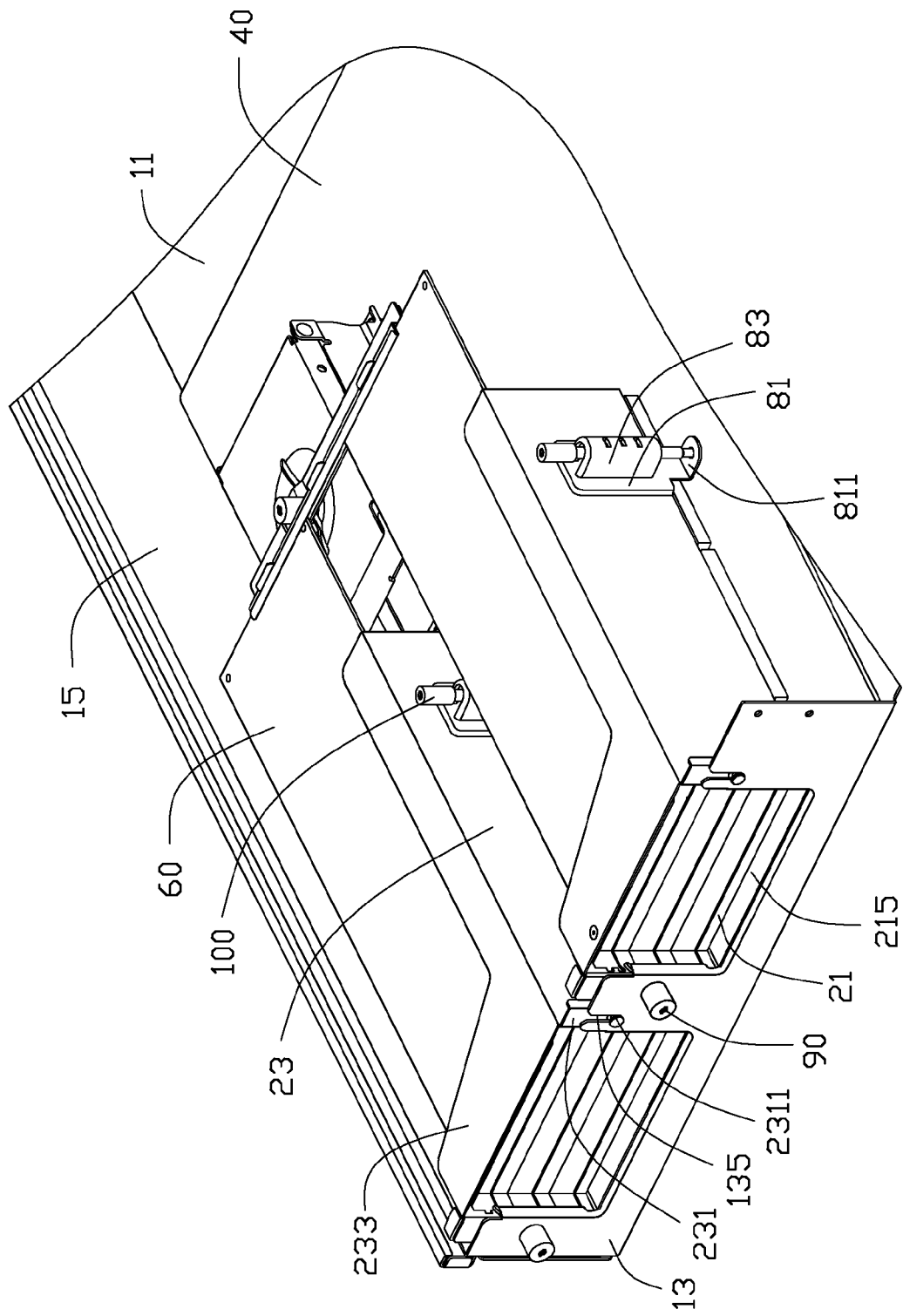
FIG. 4 is an assembled view of FIG. 1.
Figure 5:
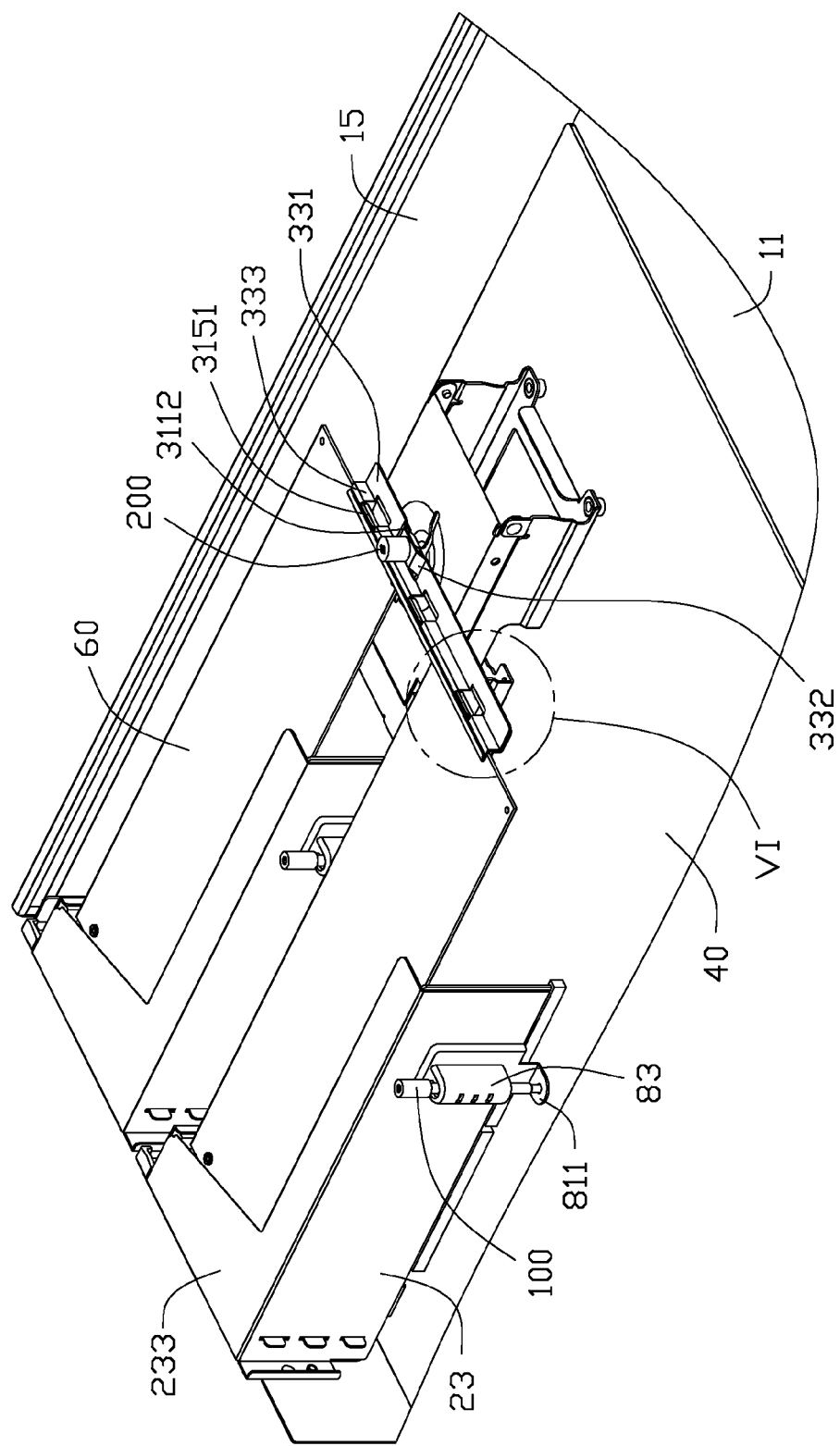
FIG. 5 is an assembled view of FIG. 2.

Referring to FIGS. 4 and 5, both mounting trays 20 are shown, but for simplifying explanation the assembly of only one mounting tray 20 is described. The mounting tray 20 is accommodated in the opening 131 of the front plate 13, with the extend pieces 215 of the mounting tray 20 abutting against the supporting piece 1311 of the front plate 13. The protruding post 2311 is inserted into the notch 135 of the front plate 13, and the mounting piece 811 is located on the bottom plate 11 of the chassis 10. The screw hole 133 of the front plate 13 is aligned with the securing hole 2131 of the front panel 21, and a screw member 90 is inserted into the screw hole 133 and the securing hole 2131, to secure the mounting tray 20 to the front plate 13. The mounting hole 8112 is aligned with the mounting hole 41 of motherboard 40 and the hole of the bottom plate 11. A fixing member 100 is passed in turn through the through hole 831, the mounting holes 8112, the mounting hole 41 of the motherboard 40 and the hole of the bottom plate 11. Thus, the side panel 23 of the mounting tray 20 is positioned to the bottom plate 11 with the fixing member 100.

The first supporting member 31 of the supporting device 30 is placed on the top of the carrier 50, and the two positioning portions 3114 are positioned in the two positioning holes 51 of the carrier 50, so as to mount the first supporting member 31 to the carrier 50.

The first and second expansion cards 60, 70 are received in the mounting tray 20, and the expansion pieces 61, 71 are positioned on the expansion slots 2112. The inserting portions 613,713 are inserted into the three clipping holes 232 of the side panel 23. The flanges 611, 711 of the expansion cards 61, 71 abut the stopper piece 213 of the front panel 21. The flanges 611, 711 are capable of being secured to the stopper piece 213 with fasteners (not shown), such as screws. The end of the first expansion card 60 is supported on the supporting plate 315 of the first supporting member 31.

Figure 6:
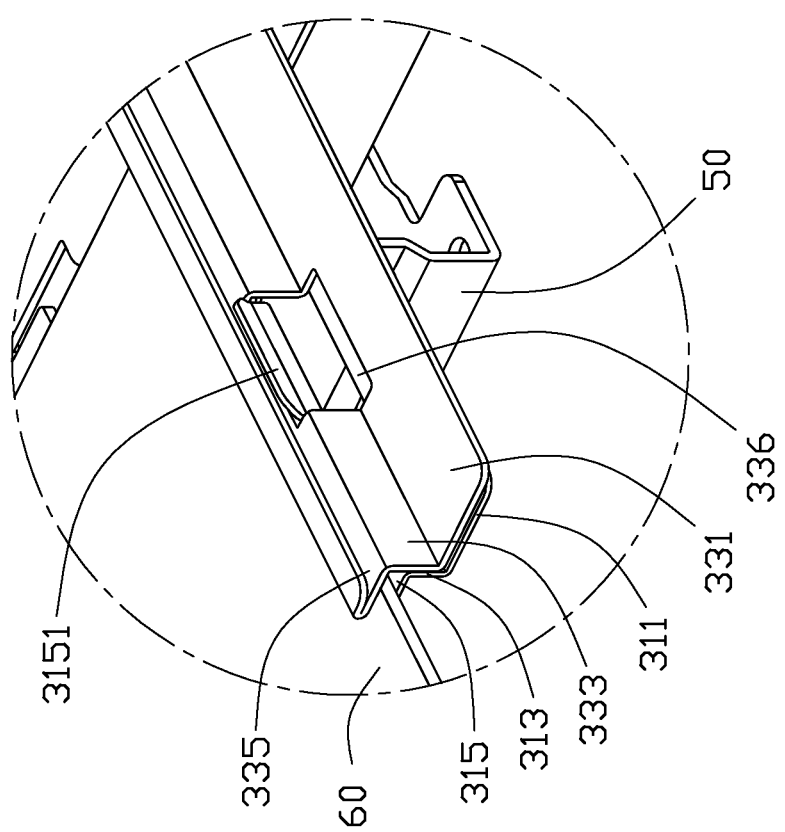
FIG. 6 is an enlarged view of circled portion VI of FIG. 5.

Referring to FIGS. 3 and 6, the second supporting member 33 is put on the first supporting member 31, and the fastening plate 331 of the second supporting member 33 is supported on the fixing plate 311 of the first supporting member 31. The three catches 3151 of the first supporting member 31 are clipped into the three clasping holes 336 of the second supporting member 33, the fastening hole 3321 of the bridge 332 is aligned with the locking hole 3113 of the protrusion 3112, and a securing member 200 is inserted into the fastening hole 3321 and the locking hole 3113, to mount the fastening plate 331 to the fixing plate 311. The retaining plate 335 is laid on the top surface of the first expansion card 60, and the first expansion card 60 is sandwiched between the retaining plate 335 and the supporting plate 315. Therefore, the supporting device 30 can support the first expansion card 60, which is longer than the two second expansion cards 70, steadily and securely in the mounting tray 20.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
    a chassis comprising a bottom plate;
    two expansion pieces configured for being attached to first ends of two expansion cards respectively, the two expansion pieces located side by side in the chassis so that the two expansion cards located in a plane parallel with the bottom plate;
    a carrier mounted on the bottom plate; and
    a supporting device configured for supporting second ends of the two expansion cards simultaneously, the supporting device comprising a first supporting member secured to the carrier, and a second supporting member secured to the first supporting member, wherein the first supporting member and the second supporting member sandwich both the expansion cards therebetween when the second supporting member is attached on the first supporting member.

2. The mounting apparatus of claim 1, wherein a catch is located on the first supporting member, and a clasping hole engaged with the catch is defined in the second supporting member.

3. The mounting apparatus of claim 2, wherein the first supporting member comprises a supporting plate, and the supporting plate is located on bottom surfaces of the expansion cards.

4. The mounting apparatus of claim 3, wherein the catch is positioned on the supporting plate.

5. The mounting apparatus of claim 3, wherein the first supporting member comprises a fixing plate, secured on the carrier, and a connecting plate, connected to the fixing plate; and the connecting plate is substantially perpendicular to the fixing plate and the supporting plate.

6. The mounting apparatus of claim 5, wherein the second supporting member comprises a retaining plate, and the retaining plate is engaged with the supporting plate to sandwich the expansion cards.

7. The mounting apparatus of claim 5, wherein a positioning hole is defined on the carrier, and a positioning portion engaged with the positioning hole is located on the fixing plate.

8. The mounting apparatus of claim 6, wherein the second supporting member comprises a fastening plate, a bridge is located on the fastening plate, and a protrusion secured to the bridge is positioned on the fixing plate.

9. The mounting apparatus of claim 8, wherein the clasping hole is defined on the fastening plate and extends to the retaining plate.

10. A mounting apparatus comprising:
    a chassis having a bottom plate, a front plate connected to the bottom plate, and a side plate connected to the bottom plate and the front plate, two expansion slots defined on the front plate, and the two expansion slots extend along one line that is parallel with the bottom plate;
    a carrier configured for being secured on the bottom plate and abutting the side plate;
    two mounting trays located in the chassis side by side, each comprising a front panel secured to the front plate;
    two expansion pieces configured for being secured to two expansion cards for being accommodated in the two expansion slots respectively; and
    an supporting member secured to the carrier, the supporting member extending in a direction parallel with the line of the two expansion slots, the supporting member being at a height the same as the two expansion slots with respect to the bottom plate, the supporting member being long enough to support the ends of the two expansion cards both, where the ends are outside of the mounting tray.

11. The mounting apparatus of claim 10, wherein the supporting member comprises a first supporting member and a second supporting member, a catch is located on the first supporting member, a clasping hole engaged with the catch is defined on the second supporting member, to sandwich the two expansion cards.

12. The mounting apparatus of claim 11, wherein the first supporting member comprises a supporting plate, and the supporting plate is located on a bottom surface of each expansion card.

13. The mounting apparatus of claim 12, wherein the catch is positioned on the supporting plate.

14. The mounting apparatus of claim 13, wherein the first supporting member comprises a fixing plate secured on the carrier and a connecting plate connected to the fixing plate, and the connecting plate is substantially perpendicular to the fixing plate and the supporting plate.

15. The mounting apparatus of claim 12, wherein the second supporting member comprises a retaining plate, and the retaining plate is engaged with the supporting plate to sandwich each expansion card.

16. The mounting apparatus of claim 14, wherein a positioning portion is located on the fixing plate, and a positioning hole receiving the positioning portion is defined on the carrier.

17. The mounting apparatus of claim 14, wherein the second supporting member comprises a fastening plate, a bridge is located on the fastening plate, and a protrusion secured to the bridge is positioned on the fixing plate.

18. The mounting apparatus of claim 17, wherein the second supporting member comprises the connecting plate, and the clasping hole is defined on the fastening plate, extends to a retaining plate.

* * * * *